(12) United States Patent
Hung

(10) Patent No.: US 7,398,950 B2
(45) Date of Patent: Jul. 15, 2008

(54) SUPPORT APPARATUS

(75) Inventor: Chin-Jui Hung, Taichung Hsien (TW)

(73) Assignee: Modernsolid Industrial Co., Ltd., Taichung Hsien (TW)

( * ) Notice: Subject to any disclaimer, the term of this patent is extended or adjusted under 35 U.S.C. 154(b) by 77 days.

(21) Appl. No.: 11/593,575

(22) Filed: Nov. 7, 2006

(65) Prior Publication Data
US 2008/0078906 A1   Apr. 3, 2008

(30) Foreign Application Priority Data
Sep. 12, 2006   (TW) ............................... 95216251 U

(51) Int. Cl.
*E04G 3/00* (2006.01)
(52) U.S. Cl. ................. 248/276.1; 248/282.1; 248/917; 248/919; 248/921; 248/923
(58) Field of Classification Search ......... 248/917–723, 248/176.1, 282.1, 276.1
See application file for complete search history.

(56) References Cited
U.S. PATENT DOCUMENTS
6,857,610 B1 *  2/2005  Conner et al. ............ 248/284.1
6,915,996 B2 *  7/2005  Lin ........................ 248/288.51
7,317,611 B2 *  1/2008  Dittmer .................... 361/681
2002/0011544 A1 * 1/2002  Bosson ..................... 248/121

* cited by examiner

*Primary Examiner*—Amy J. Sterling
(74) *Attorney, Agent, or Firm*—Rosenberg, Klein & Lee

(57) ABSTRACT

A support apparatus for suspending a monitor has a mounting seat, a support arm assembly, an adjusting assembly and a connecting assembly. The support arm assembly is connected pivotally to the mounting seat and has two first support arms and two second support arms. The first support arms are connected to the mounting seat, and the second support arms are connected respectively to the first support arms. The adjusting assembly is connected rotatably to the support arm assembly and has a mounting bracket and an adjusting bracket. The mounting bracket is connected to the second support arms. The adjusting bracket is connected pivotally to the mounting bracket. The connecting assembly is connected detachably to the adjusting assembly, is connected with the monitor and has a connecting frame and two hanging beams. The connecting frame is connected to the adjusting bracket. The hanging beams are connected detachably to the connecting frame.

10 Claims, 8 Drawing Sheets

SUPPORT APPARATUS

BACKGROUND OF THE INVENTION

1. Field of the Invention

The present invention relates to a support apparatus, and more particularly relates to a support apparatus for suspending a monitor and that can adjust the angular position of the monitor.

2. Description of Related Art

A conventional support apparatus for a monitor having a back, and the conventional support apparatus has a mounting seat and a connecting seat. The mounting seat is mounted securely on a wall or a table. The connecting seat is connected pivotally to the mounting seat and to the back of the monitor.

However, the conventional support apparatus has the following shortcomings.

1. When the connecting seat is moved to change the orientation of the monitor, users need tools to loosen and fasten bolts in the conventional support apparatus to adjust the orientation of the monitor. Therefore, to adjust the orientation of the monitor of the conventional support apparatus is inconvenient and time-consuming.

2. Furthermore, the conventional support apparatus usually has only a single adjusting angle to the orientation of the monitor, and cannot be freely adjusted in the orientation based on needs of the user.

Therefore, the present invention provides a support apparatus to mitigate or obviate the aforementioned problems.

SUMMARY OF THE INVENTION

The main objective of the present invention is to provide a support apparatus for suspending a monitor and that can adjust the angular position of the monitor.

The support apparatus for suspending a monitor has a mounting seat, a support arm assembly, an adjusting assembly and a connecting assembly. The support arm assembly is connected pivotally to the mounting seat and has two first support arms and two second support arms. The first support arms are connected to the mounting seat, and the second support arms are connected respectively to the first support arms. The adjusting assembly is connected rotatably to the support arm assembly and has a mounting bracket and an adjusting bracket. The mounting bracket is connected to the second support arms. The adjusting bracket is connected pivotally to the mounting bracket. The connecting assembly is connected detachably to the adjusting assembly, is connected with the monitor and has a connecting frame and two hanging beams. The connecting frame is connected to the adjusting bracket. The hanging beams are connected detachably to the connecting frame.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
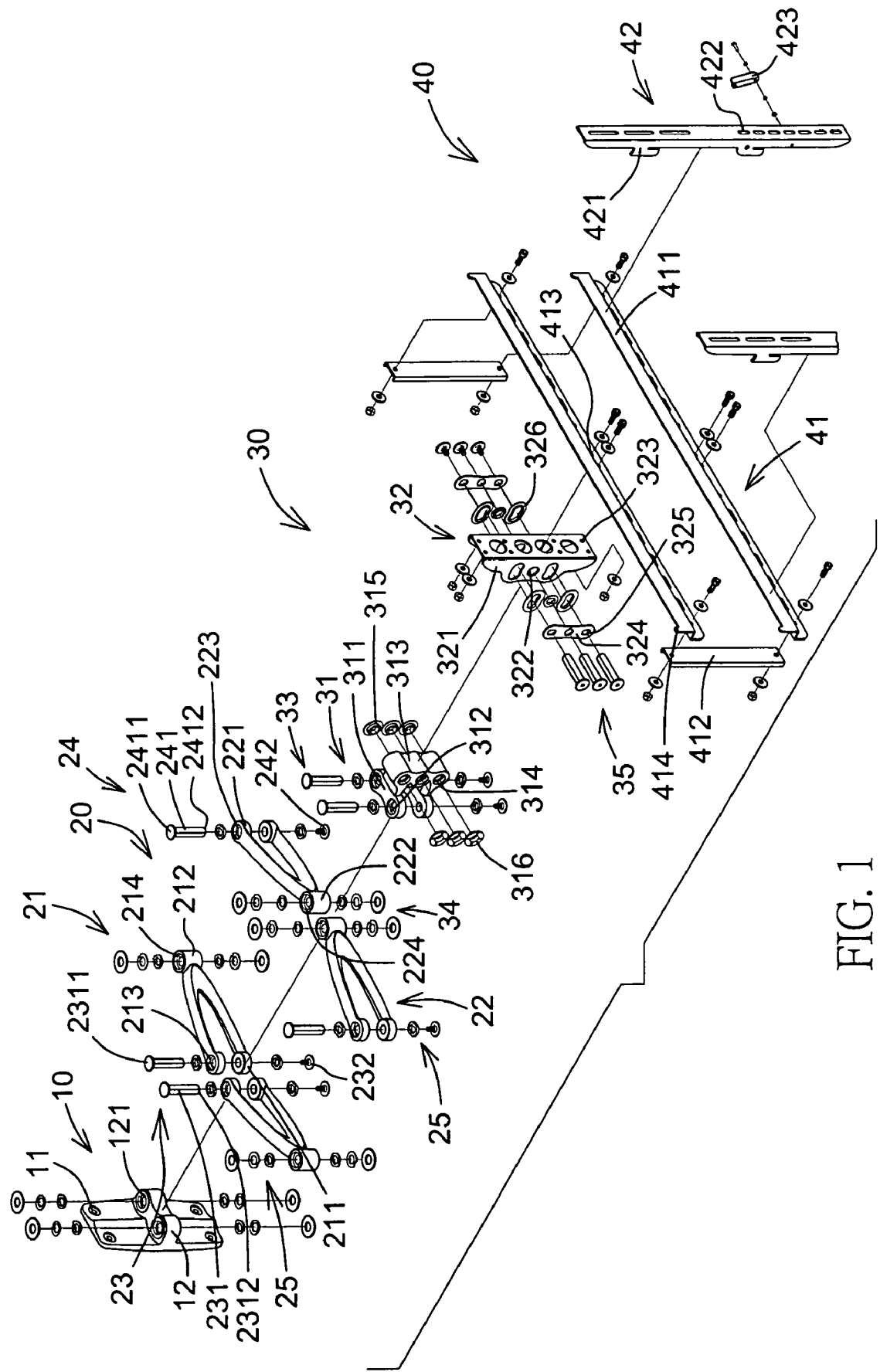
FIG. 1 is an exploded perspective view of a support apparatus for suspending a monitor in accordance with the present invention.
Figure 2:
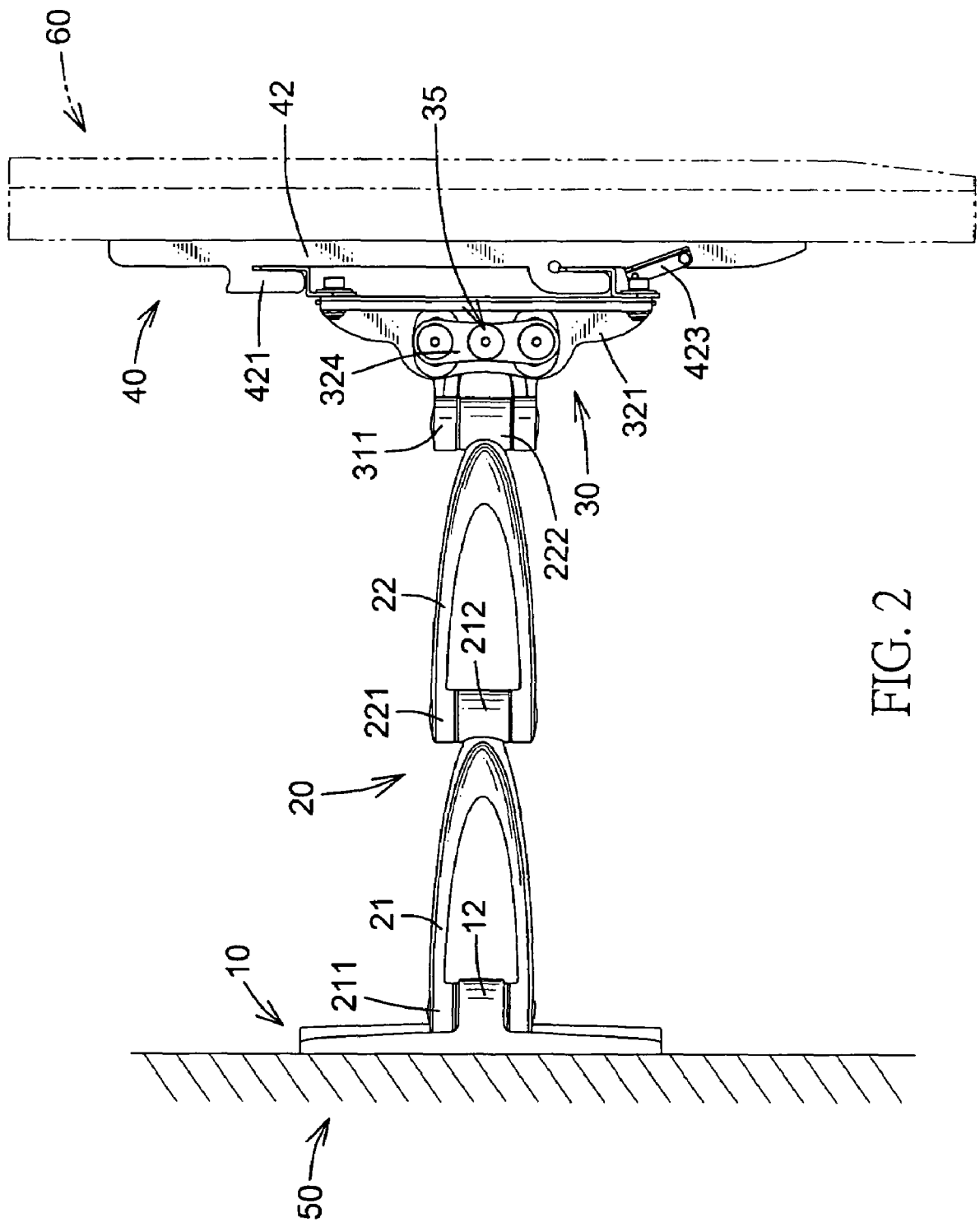
FIG. 2 is a side view of the support apparatus in FIG. 1 mounted on a wall.

With reference to FIGS. 1 and 2, a support apparatus in accordance with the present invention for suspending a monitor (60) having a back comprises a mounting seat (10), a support arm assembly (20), an adjusting assembly (30) and a connecting assembly (40).

The mounting seat (10) may be rectangular, is mounted on a table a ceiling or a wall (50) and has a rear side, a front side, an upper end, a lower end, multiple mounting holes (11) and two mounting sleeves (12). The rear side of the mounting seat (10) is attached to the table, the ceiling or the wall (50). The multiple mounting holes (11) are formed through the mounting seat (10) in the front side near the upper end and the lower end of the mounting seat (10).

The mounting sleeves (12) are formed on and protrudes from the front side of the mounting seat (10) between the upper end and the lower end and is connected with each other. Each mounting sleeve (12) has a center, a top, a bottom and a connecting hole (121). The connecting hole (121) is formed axially through the center of the mounting sleeve (12).

The support arm assembly (20) is connected pivotally to the mounting seat (10) and has two first support arms (21), two second support arms (22) and multiple washers (25). The first support arms (21) are connected to the mounting sleeves (12) of the mounting seat (10) and each first support arm (21) may be V-shaped and has two proximal ends, a distal end, two pivotal segments (211), a connecting jacket (212) and two connecting devices (23).

The pivotal segments (211) are formed respectively on the proximal ends of the first support arm (21) and are connected to a corresponding one of the mounting sleeves (12) on the mounting seat (10). The pivotal segments (211) are connected respectively to the top and the bottom of a corresponding mounting sleeve (12) and each pivotal segment (211) has a pivotal hole (213). The pivotal hole (213) is formed through the pivotal segment (211) and aligns with the connecting hole (121) in the corresponding mounting sleeve (12).

The connecting jacket (212) is formed on the distal end of the first support arm (21) and has a center, a top, a bottom and a connecting hole (214). The connecting hole (214) is formed through the center of the connecting jacket (212).

The connecting devices (23) are connected to the first support arms (21) and the mounting seat (10) and each has a pivotal post (231) and a fastening bolt (232). The pivotal post (231) is extended through the two connecting holes (214) of the pivotal segments (211) of one of the first support arms (21) and the connecting hole (121) of one of the mounting sleeves (12) in the mounting seat (10) and has an upper end, a lower end, a head (2311) and a setscrew hole (2312).

The head (2311) is formed on the upper end of the pivotal post (231) and abuts with one of the pivotal segments (211) of the first support arm (21). The lower end of the pivotal post (231) is extended through the pivotal holes (213) of the pivotal segments (211) in the first support arm (21) and the connecting hole (121) in the corresponding mounting sleeve (12). The setscrew hole (2312) is formed in the lower end of the pivotal post (231). The fastening bolt (232) is screwed into the setscrew hole (2312) of the pivotal post (231) and abuts with the other one pivotal segment (211) of the corresponding first support arm (21).

The second support arms (22) are connected respectively to the first support arms (21) and has a structure substantially same as that of the first support arms (21). Each second support arm (22) has two proximal ends, a distal end, two pivotal segments (221), a connecting jacket (222) and two connecting devices (24).

The pivotal segments (221) are formed respectively on the proximal ends of the second support arm (22) and are connected to the connecting jacket (212) of a corresponding one of the first support arms (21). The pivotal segment (221) are connected respectively to the top and the bottom of the connecting jacket (212) of a corresponding one of the first support arms (21) and each pivotal segment (221) has a pivotal hole (223). The pivotal hole (223) is formed through the pivotal segment (221) and aligns with the connecting hole (214) in the connecting jacket (212) of the corresponding first support arm (21).

The connecting jacket (222) is formed on the distal end of the second support arm (22) and has a center, a top, a bottom and a connecting hole (224). The connecting hole (224) is formed through the center of the connecting jacket (222).

The connecting devices (24) are connected to the first support arms (21) and the second support arms (22) and each has a pivotal post (241) and a fastening bolt (242). The pivotal post (241) is extended through the two connecting holes (224) of the pivotal segments (221) of one of the second support arms (22) and the connecting hole (214) in the connecting jacket (212) of a corresponding one of the first support arms (21). The pivotal post (241) has an upper end, a lower end, a head (2411) and a setscrew hole (2412).

The head (2411) is formed on the upper end of the pivotal post (241) and abuts with one of the pivotal segments (221) of the second support arm (22). The lower end of the pivotal post (241) is extended through the pivotal holes (223) in the pivotal segments (221) of the second support arm (22) and the connecting hole (214) in the connecting jacket (212) of the corresponding first support arm (21). The setscrew hole (2412) is formed in the lower end of the pivotal post (241). The fastening bolt (242) is screwed into the setscrew hole (2412) of the pivotal post (241) and abuts with the other one pivotal segment (221) of the second support arm (22).

The washers (25) are mounted in the connecting holes (121) of the mounting sleeves (12), the pivotal holes (213) of the first support arms (21), the connecting holes (214) of the first support arms (12) and the pivotal holes (223) of the second support arms (22) and are mounted around the pivotal posts (231, 241) of the connecting devices (23, 24).

The adjusting assembly (30) is connected pivotally to the support arm assembly (20) and has a mounting bracket (31), an adjusting bracket (32) and multiple washers (34).

The mounting bracket (31) may be U-shaped, is connected pivotally to the connecting jackets (222) of the second support arms (22) and has two extending ends, a bottom, two mounting plates (311), multiple lateral tubes (313), multiple rings (315), multiple washers (316) and two connecting devices (33).

The mounting plates (311) are formed respectively on the extending ends of the mounting bracket (31) and are connected to the connecting jackets (222) of the second support arms (22). Each mounting plate (311) has two mounting holes (312) formed in the mounting plate (311). The mounting holes (312) are aligned respectively with the connecting holes (224) in the connecting jackets (222) of the second support arms (22).

The lateral tubes (313) are formed transversely and continuously on the bottom of the mounting bracket (31) and each lateral tube (313) has two ends and a through hole (314). The through hole (314) is formed through the ends of the lateral tube (313) and has a diameter. In a preferred embodiment, three lateral tubes (313) are formed on the bottom of the mounting bracket (31).

The rings (315) are connected to the lateral tubes (313) and are mounted respectively in ends of the lateral tubes (313). The washers (316) are attached to the lateral tubes (313) at the ends opposite to the rings (315).

The connecting devices (33) have structures substantially same as that of the connecting devices (23, 24) and extend through the mounting holes (312) in the mounting plates (311) of the mounting bracket (31) and the connecting holes (224) in the connecting jackets (222) of the second support arms (22) to connect the second support arms (22) with the mounting bracket (31).

The adjusting bracket (32) may be U-shaped, is connected pivotally to the mounting bracket (31) and has a bottom, two connecting panels (321), multiple mounting holes (323), multiple pressing rings (326), two spacers (324), and multiple mounting devices (35).

The connecting panels (321) are formed on and protrude from the bottom of the adjusting bracket (32) and correspond respectively to the ends of the lateral tubes (313) of the mounting bracket (31) and each connecting panel (321) has multiple adjusting holes (322). The adjusting holes (322) are formed through the connecting plates (321) and align with the through holes (314) of the lateral tubes (313) on the mounting bracket (31), and each adjusting hole (322) has a diameter. The diameters of the adjusting holes (322) are larger than the diameters of the through holes (314) of the lateral tubes (313).

The mounting holes (323) are formed through the bottom of the adjusting bracket (32). The pressing rings (326) are mounted in the adjusting holes (322). The spacers (324) are attached to the pressing rings (326) and each spacer (324) has multiple through holes (325). The through holes (325) are formed through the spacer (324) and align with the adjusting holes (322) and the through holes (314) of the lateral tubes (313).

The mounting devices (35) have structures substantially same as that of the connecting devices (33) and extend through the through holes (325) in the spacers (324), the pressing rings (326), the adjusting holes (322) in the connecting panels (321) and the through holes (314) in the lateral tubes (313) of the mounting bracket (31) to connect the adjusting bracket (32) with the mounting bracket (31).

The washers (34) are mounted in the connecting holes (224) of the connecting jackets (222) in the second support arms (22) and the corresponding mounting holes (312) of the mounting plates (311).

The connecting assembly (40) is connected detachably to the adjusting assembly (30), connects with the back of the monitor (60) and has a connecting frame (41) and two hanging beams (42). The connecting frame (41) may be rectangular, is connected to the adjusting bracket (32) at a side opposite to the mounting bracket (31) and has two lateral beams (411) and two longitudinal beams (412).

The lateral beams (411) are attached to the bottom of the adjusting bracket (32) and each lateral beam (411) has a lower segment, an upper segment, two ends, multiple connecting hole (413) and two retaining tabs (414). The lower segment of the lateral beam (411) is connected to the bottom of the adjusting bracket (32). The connecting holes (413) are formed through the lower segments of the lateral beams (411) and align with the mounting holes (323) in the adjusting bracket (32).

In a preferred embodiment, the lateral beams (411) are connected to the adjusting bracket (32) with multiple bolts extending through the mounting holes (323) in the adjusting bracket (32) and the connecting holes (413) in the lateral beams (411).

The retaining tabs (414) are respectively formed on and protrude from the upper segment of the lateral beam (411) on the ends. The longitudinal beams (412) are connected to the lower segments of the lateral beams (411).

The hanging beams (42) are connected detachably to the connecting frame (41) and each hanging beam (42) has two extending edges, a bottom, multiple mounting holes (422), multiple hangers (421) and a restricting member (423). The bottom of the hanging beam (42) is connected to the back of the monitor (60). The mounting holes (422) are formed through the bottom of the hanging beam (42).

In a preferred embodiment, the hanging beams (42) are connected to the monitor (60) with multiple bolts extending through the back of the monitor (60) and the mounting holes (422) in the hanging beams (42).

The hangers (421) are formed on the extending edges of the hanging beam (42) and are hanged on the upper segments of the lateral beams (411) to connect the hanging beams (42) with the connecting frame (41). The restricting member (423) is attached to one of the extending edges below the hangers (421) and abuts against the bolts on the connecting frame (41) to prevent the hanging beams (42) separating from the connecting frame (41).

In use, with reference to FIG. 2, users can mount the mounting seat (10) on a wall (50) or a ceiling with bolts and attach the back of the monitor (60) to the hanging beams (42) of the connecting frame (40). Then, the monitor (60) can be suspended and adjusted with the support apparatus.

The operation of the support apparatus for changing the orientation of the monitor (60) are shown in FIGS. 3 to 8, the support apparatus can be adjusted with multiple angles according to users' needs.

Figure 3:
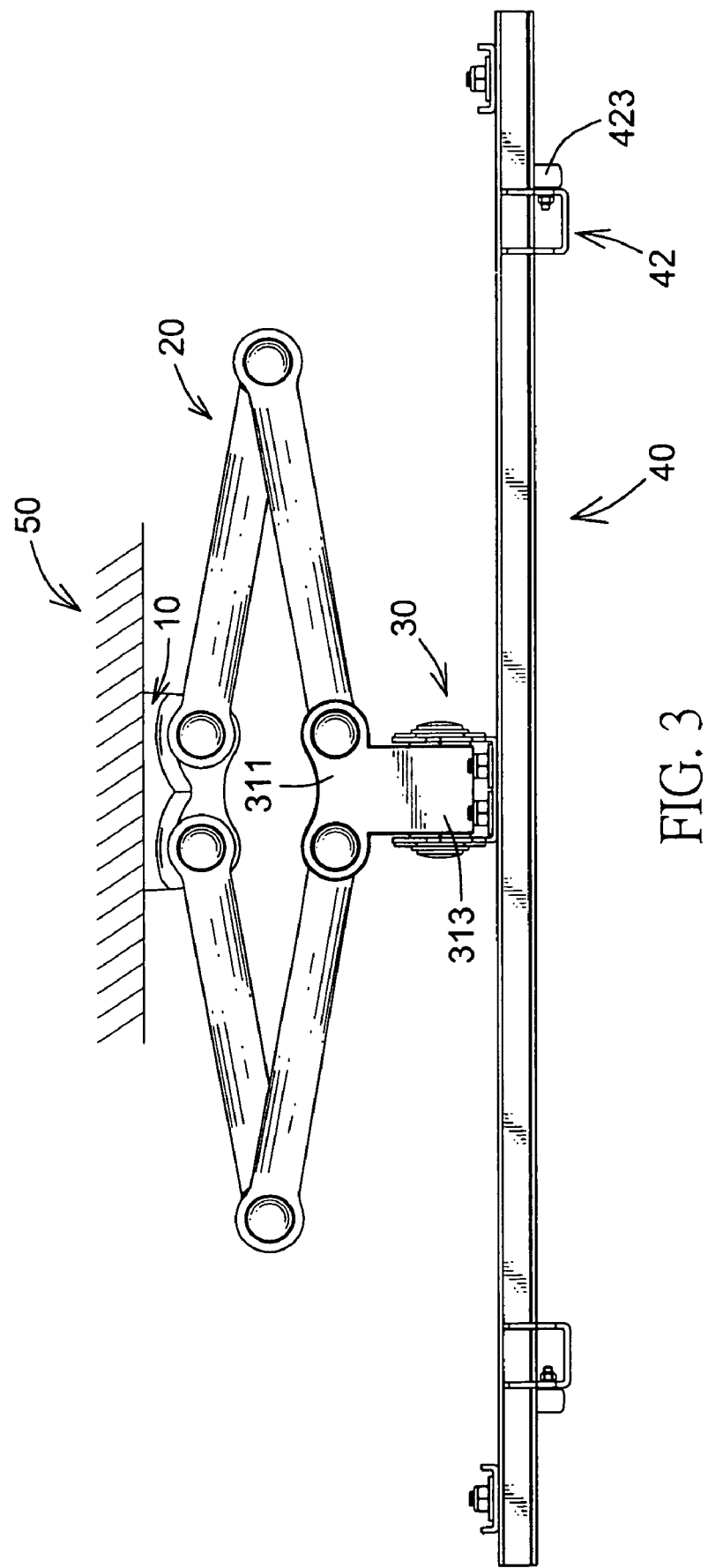
FIG. 3 is a top view of the support apparatus in FIG. 1 mounted on a wall.
Figure 4:
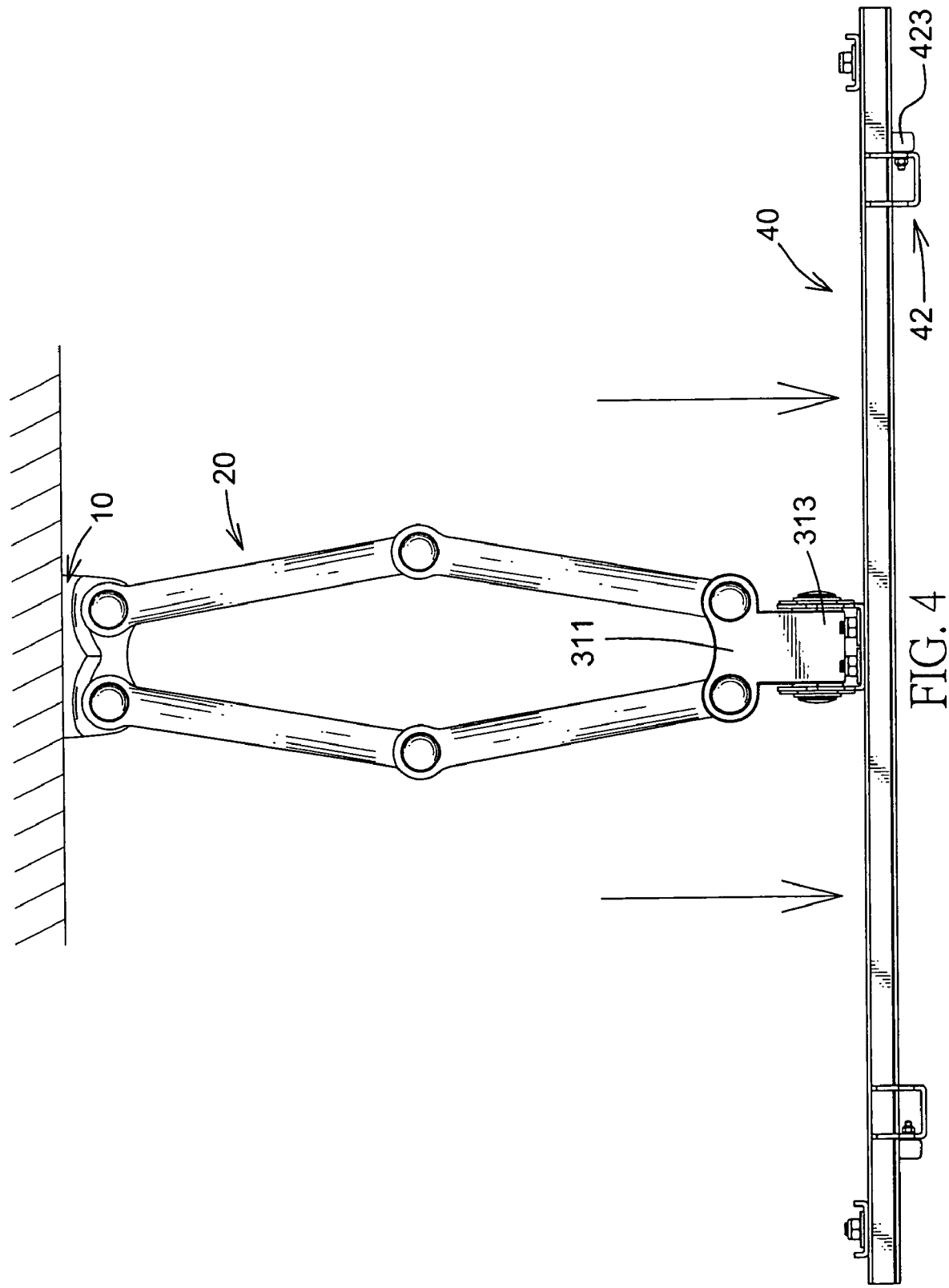
FIG. 4 is an operational top view of the support apparatus in FIG. 2 showing that the support apparatus is expanded.

With reference to FIGS. 3 and 4, users can adjust the distance between the monitor (60) and the wall (50) by pushing or pulling the second support arms (22) to pivotally rotate relative to the first support arms (21). Then, the monitor (60) can be approached to or went away from the wall (50).

Figure 5:
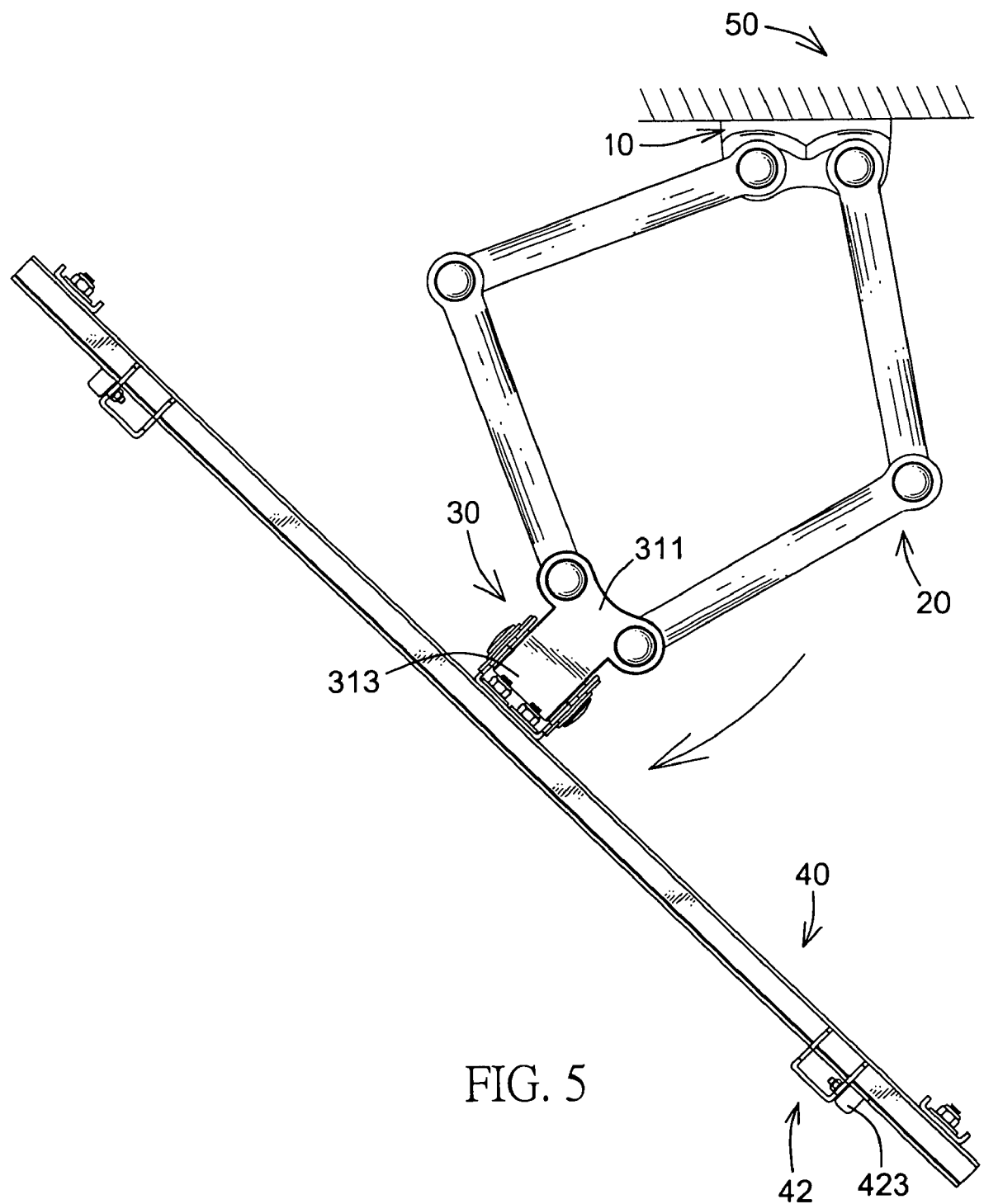
FIG. 5 is another operational top view of the support apparatus in FIG. 2 showing that the angular position of the supporting apparatus is changed.
Figure 6:
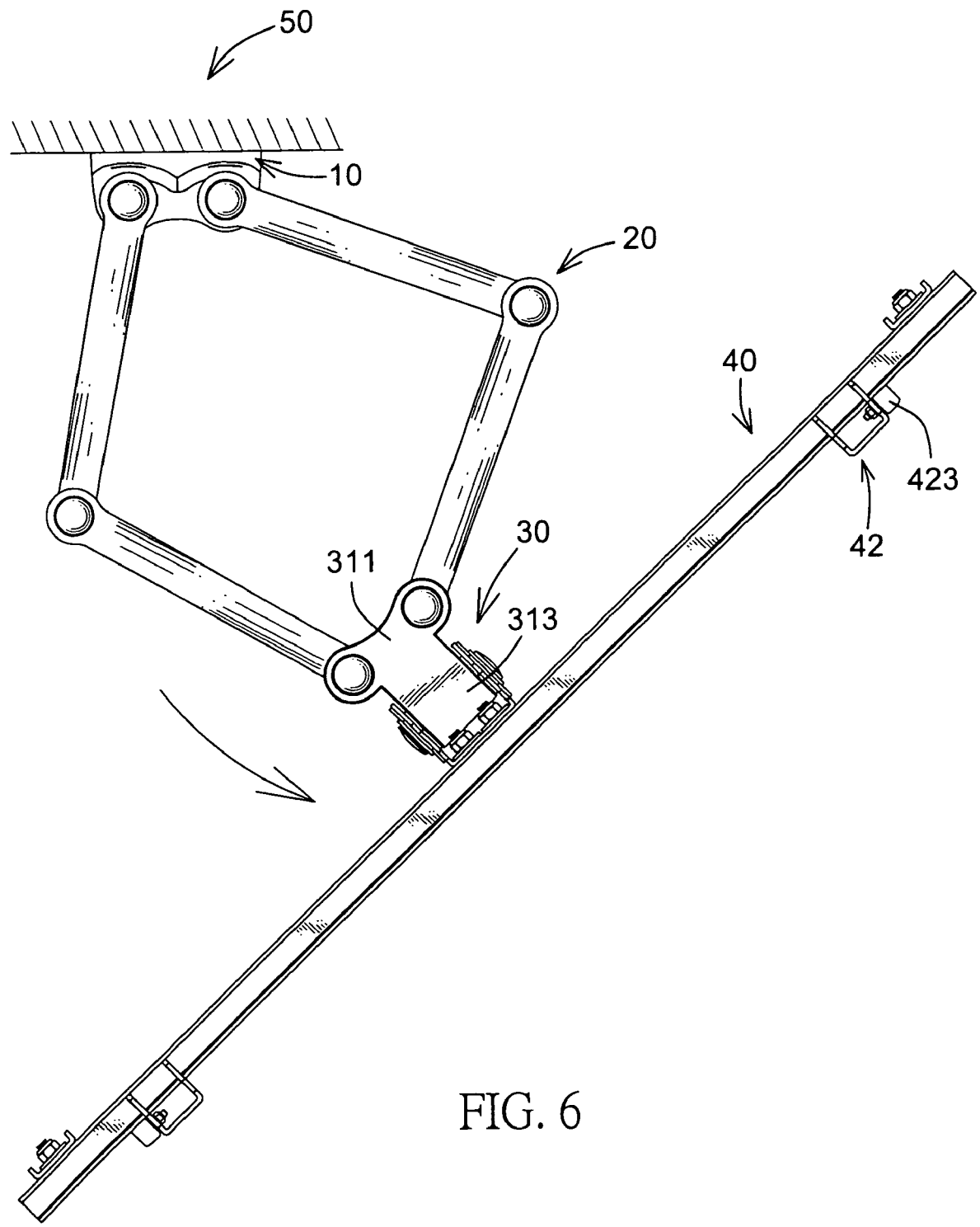
FIG. 6 is an operational top view of the support apparatus in FIG. 2 showing that the angular position of the supporting apparatus is changed.

With reference to FIGS. 5 and 6, users can adjust the angular position of the monitor (60) to incline right or left relative to the wall (50) by pivoting the mounting bracket (31) of the adjusting assembly (30) relative to the second support arms (22).

Figure 7:
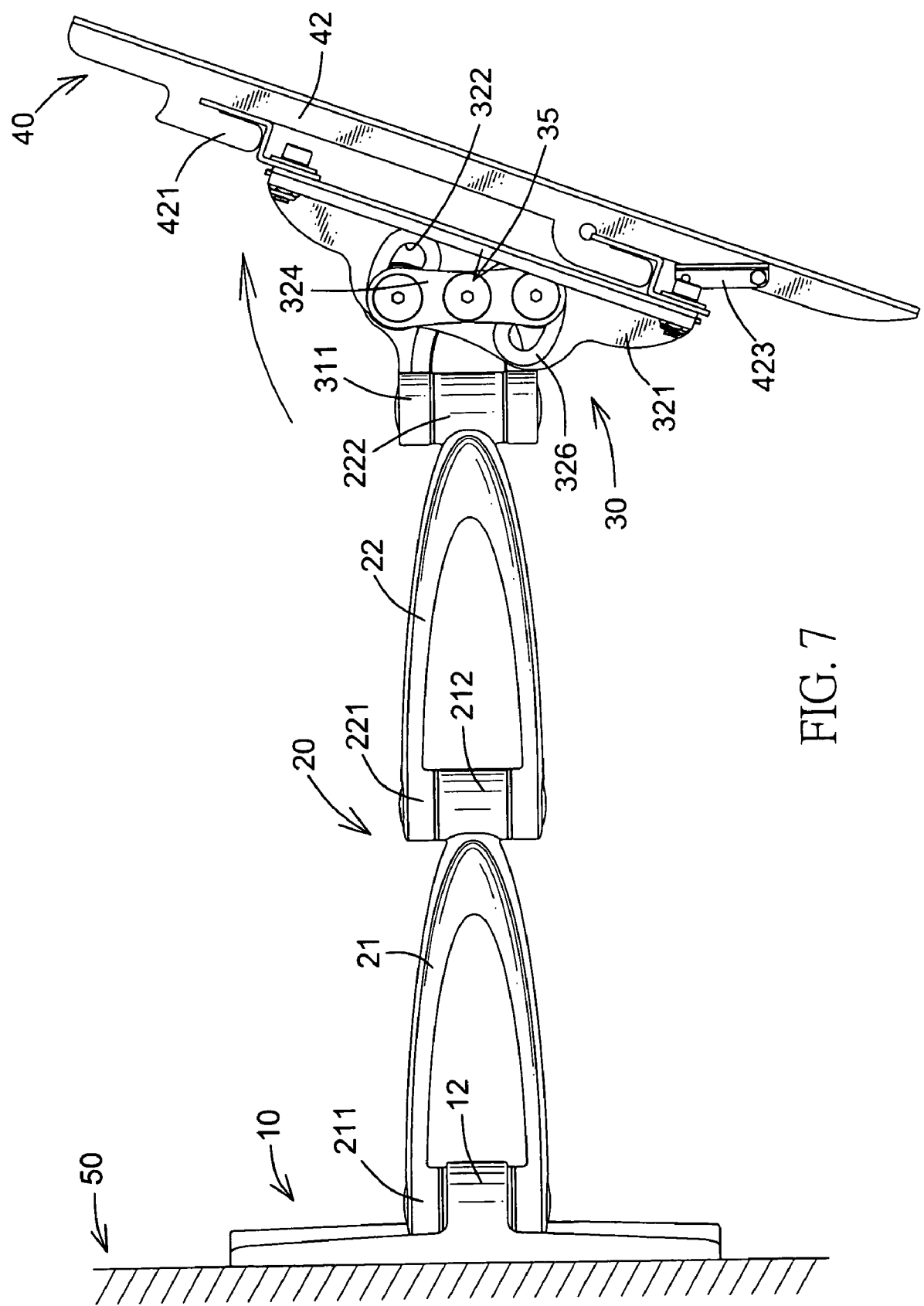
FIG. 7 is an operational side view of the support apparatus in FIG. 2 showing that the angular position of the supporting apparatus is changed.
Figure 8:
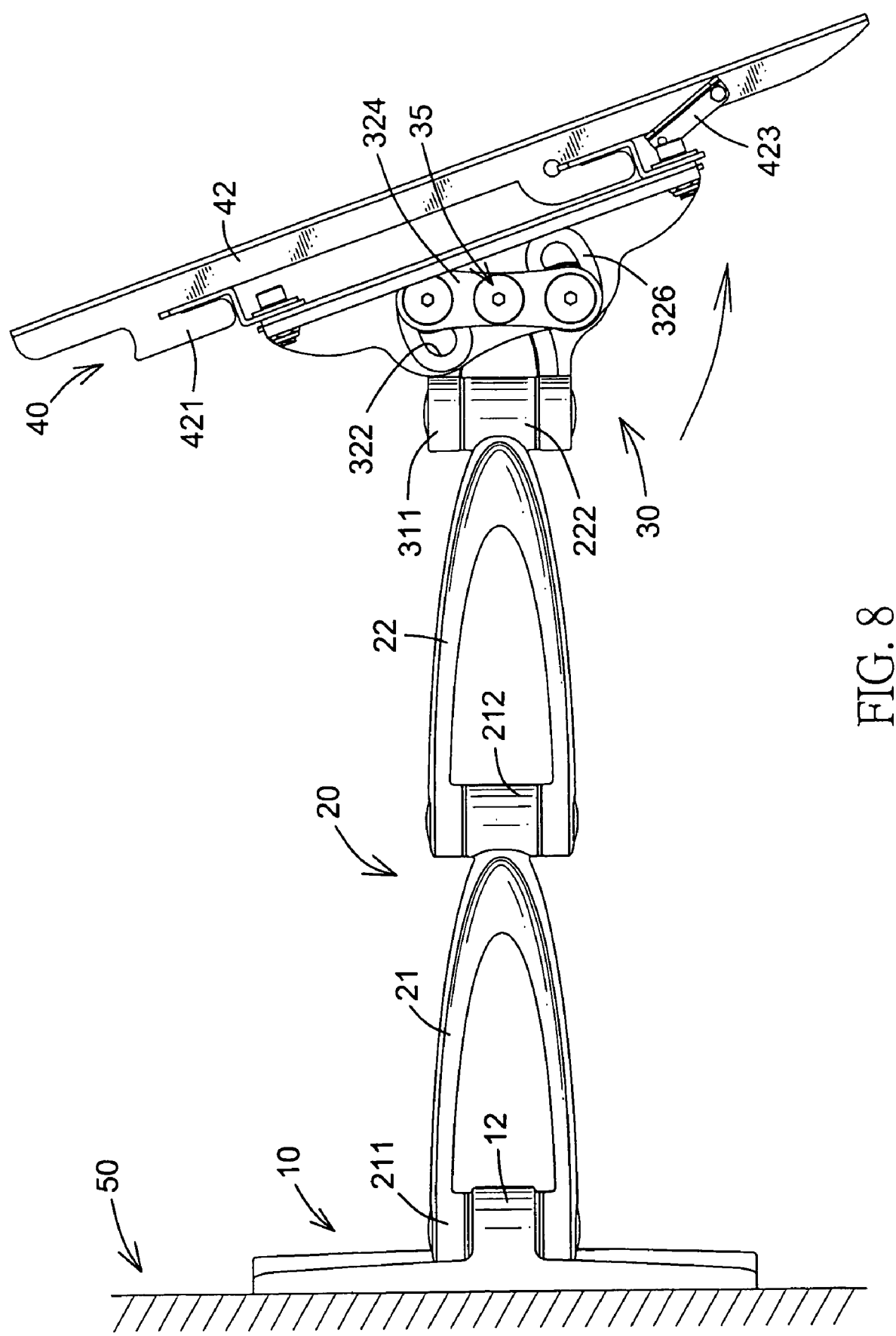
FIG. 8 is another operational top view of the support apparatus in FIG. 2 showing that the angular position of the supporting apparatus is changed.

With reference to FIGS. 7 and 8, users can adjust the angular position of the monitor (60) to incline up or down relative to the wall (50) by pivoting the adjusting holes (322) of the adjusting bracket (32) relative to the lateral tubes (313) of mounting bracket (31).

The support apparatus for suspending a monitor (60) has the following advantages.

1. Users can manually adjust the support apparatus to change the orientation of the monitor (60) without using tools. Therefore, adjusting the orientation of the monitor of the conventional support apparatus is convenient and quick.

2. Users can adjust the orientation of the monitor (60) by directly pulling, pushing or pivoting the second support arms (22), the mounting bracket (31) and the adjusting bracket (32) to make the monitor (60) approaching to, going away from or inclined relative to the wall (50).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A support apparatus for suspending a monitor with a back, and the support apparatus comprising
 a mounting seat having
  a front side;
  an upper end;
  a lower end;
  multiple mounting holes being formed through the mounting seat in the front side near the upper end and the lower end of the mounting seat; and
  two mounting sleeves being formed on and protruding from the front side of the mounting seat between the upper end and the lower end and connected with each other;
 a support arm assembly being connected pivotally to the mounting seat and having
  two first support arms being connected pivotally to the mounting sleeves of the mounting seat and each first support arm having
   two proximal ends;
   a distal end;
   two pivotal segments being formed respectively on the proximal ends of the first support arm and connected pivotally to one of the mounting sleeves on the mounting seat;
   a connecting jacket being formed on the distal end of the first support arm; and
   a connecting device being connected to the pivotal segments of the first support arm and a corresponding one of the mounting sleeves of the mounting seat; and
  two second support arms being connected respectively to the first support arms and each second support arm having
   two proximal ends;
   a distal end;
   two pivotal segments being formed respectively on the proximal ends of the second support arm and connected to the connecting jacket of one of the first support arms;
   a connecting jacket being formed on the distal end of the second support arm; and
   a connecting device being connected to the connecting jacket of one of the first support arms and the pivotal segments of the second support arm;
 an adjusting assembly being connected pivotally to the support arm assembly and having
  a mounting bracket being connected pivotally to the connecting jackets of the second support arms and having
   a bottom; and multiple lateral tubes being formed transversely and continuously on the bottom of the mounting bracket;

an adjusting bracket being connected pivotally to the mounting bracket and having
a bottom; and
two connecting panels being formed on and protruding from the bottom of the adjusting bracket and corresponding to the lateral tubes of the mounting bracket; and a connecting assembly being connected detachable to the adjusting assembly to connect with the back of the monitor and having
a connecting frame being connected to the adjusting bracket; and
two hanging beams being connected detachably to the connecting frame.

2. The support apparatus for suspending a monitor as claimed in claim 1, wherein
the connecting device of each first support arm has
a pivotal post being extended through the two connecting holes of the pivotal segments of the first support arm and the connecting hole of the corresponding mounting sleeve in the mounting seat and having
an upper end;
a lower end being extended through the pivotal holes of the pivotal segments in the first support arm and the connecting hole in the corresponding mounting sleeve;
a head being formed on the upper end of the pivotal post and abutting with one of the pivotal segments of the first support arm; and
a setscrew hole being formed in the lower end of the pivotal post; and
a fastening bolt being screwed into the setscrew hole of the pivotal post and abutting with the other one pivotal segment of the first support arm; and
the connecting device of each second support arm has
a pivotal post being extended through the two connecting holes of the pivotal segments of the second support arm and the connecting hole in the connecting jacket of a corresponding one of the first support arms and each pivotal post having
an upper end;
a lower end being extended through the pivotal holes in the pivotal segments of the second support arm and the connecting hole in the connecting jacket of the corresponding first support arm;
a head being formed on the upper end of the pivotal post and abutting with one of the pivotal segments of the second support arm; and
a setscrew hole being formed in the lower end of the pivotal post; and
a fastening bolt being screwed into the setscrew hole of the pivotal post and abutting with the other one pivotal segment of the second support arm.

3. The support apparatus for suspending a monitor as claimed in claim 2, wherein
each mounting sleeve has
a center;
a top;
a bottom; and
a connecting hole being formed axially through the center of the mounting sleeve; and
the pivotal segments of each first support arm are connected to the top and the bottom of a corresponding one of the mounting sleeves on the mounting seat, and each pivotal segment has a pivotal hole formed through the pivotal segment and aligning with the connecting hole in the corresponding mounting sleeve.

4. The support apparatus for suspending a monitor as claimed in claim 3, wherein
the connecting jacket of each first support arms has
a center;
a top;
a bottom; and
a connecting bole being formed through the center of the connecting jacket; and
the pivotal segments of each second support arm are connected to the top and the bottom of the connecting jacket of a corresponding one of the first support arms and each pivotal segment has a pivotal hole formed through the pivotal segment and aligning with the connecting hole in the connecting jacket of the corresponding first support arm.

5. The support apparatus for suspending a monitor as claimed in claim 4, wherein
the connecting jacket of each second support arm has
a center;
a top;
a bottom; and
a connecting hole being formed through the center of the connecting jacket; and
the mounting bracket has
two extending ends;
two mounting plates being formed respectively on the extending ends of the mounting bracket and connected to the connecting jackets of the second support arms, and each mounting plate having two mounting holes formed in the mounting plate and aligning respectively with the connecting holes in the connecting jackets of the second support arms; and
two connecting devices being extended through the mounting holes in the mounting plates of the mounting bracket and the connecting holes in the connecting jackets of the second support arms to connect the second support arms with the mounting bracket.

6. The support apparatus for suspending a monitor as claimed in claim 5, wherein
each lateral tube of the mounting bracket has
two ends; and
a through hole formed through the ends of the lateral tube and having a diameter;
the mounting bracket further has multiple rings connected to the lateral tubes and each ring being mounted in one of the ends of one of the lateral tubes;
each connecting panel has multiple adjusting holes being formed through the connecting plates and aligning with the through holes of the lateral tubes on the mounting bracket, and each adjusting hole has a diameter larger than the diameters of the through holes of the lateral tubes; and
the adjusting bracket has multiple mounting devices being extended through the adjusting holes in the connecting panels and the through holes in the lateral tubes of the mounting bracket to connect the adjusting bracket with the mounting bracket.

7. The support apparatus for suspending a monitor as claimed in claim 6, wherein
the adjusting bracket has multiple mounting holes being formed through the bottom of the adjusting bracket;
the connecting frame of the connecting assembly has two lateral beams being attached to the bottom of the adjusting bracket and each lateral beam having
a lower segment being connected to the bottom of the adjusting bracket;
an upper segment; and
multiple connecting hole being formed through the lower segment of the lateral beam and aligning with the mounting holes in the adjusting bracket; and
two longitudinal beams being connected to the lower segments of the lateral beams; and
each hanging beam has
two extending edges;
a bottom being adapted to connect to the back of the monitor; and
multiple hangers being formed on the extending edges of the hanging beam and being hanged on the upper segments of the lateral beams to connect the hanging beam with the connecting frame.

8. The support apparatus for suspending a monitor as claimed in claim 7, wherein
the support assembly further has multiple washers mounted in the connecting holes of the mounting sleeves, the pivotal holes of the first support arms, the connecting holes of the first support arms and the pivotal holes of the second support arms and mounted around the pivotal posts of the connecting devices;
the mounting bracket further has multiple washer attached to the lateral tubes at the ends opposite to the rings; and
the adjusting assembly further has multiple washer being mounted in the connecting holes of the connecting jackets in the second support arms and the mounting holes of the mounting plates.

9. The support apparatus for suspending a monitor as claimed in claim 8, wherein
the adjusting bracket further has
multiple pressing rings being mounted in the adjusting holes; and
two spacers being attached to the pressing rings and each spacer having multiple through holes formed through the spacer and aligning with the adjusting holes in the adjusting bracket and the through holes of the lateral tubes.

10. The support apparatus for suspending a monitor as claimed in claim 9, wherein
each lateral beam has
two ends; and
two retaining tabs being respectively formed on and protruding from the upper segment of the lateral beam on the ends;
each hanging beam has
multiple mounting holes being formed through the bottom of the hanging beam; and
a restricting member being attached to one of the extending edges below the hangers.

* * * * *